United States Patent
Allen

[15] 3,650,694
[45] Mar. 21, 1972

[54] PROCESS FOR PREPARING PIGMENTARY METAL OXIDE

[72] Inventor: Edward M. Allen, Doylestown, Ohio

[73] Assignee: P.P.G. Industries, Inc., Pittsburgh, Pa.

[22] Filed: June 25, 1969

[21] Appl. No.: 842,430

Related U.S. Application Data

[63] Continuation of Ser. No. 361,008, Apr. 20, 1964, abandoned, Continuation-in-part of Ser. No. 234,962, Nov. 2, 1962, abandoned, which is a continuation-in-part of Ser. No. 13,860, Mar. 9, 1960, Pat. No. 3,069,282.

[52] U.S. Cl. .................................. 23/202 V, 23/1, 23/140, 23/142, 23/145, 23/148, 23/182, 23/200, 23/277, 106/300

[51] Int. Cl. ................. C01g 23/04, C01g 1/02, C01b 33/18

[58] Field of Search ............... 23/202, 1, 139, 140, 142, 182, 23/200, 145, 148; 106/300

[56] References Cited

UNITED STATES PATENTS

| | | |
|---|---|---|
| 2,340,610 | 2/1944 | Muskat et al. ......................... 23/202 |
| 2,347,496 | 4/1944 | Muskat et al. ......................... 23/202 X |
| 2,395,314 | 2/1946 | Blumer ................................. 23/219 |
| 2,788,260 | 4/1957 | Rick .................................... 23/202 |
| 3,051,639 | 8/1962 | Anderson ............................. 204/328 X |
| 3,069,281 | 12/1962 | Wilson ................................ 106/300 |
| 3,109,708 | 11/1963 | Walmsley ............................ 23/202 |
| 2,670,272 | 2/1954 | Nutting ................................ 23/139 |
| 2,740,260 | 6/1956 | Nelson et al. ....................... 23/202 V |
| 2,823,982 | 2/1958 | Saladin et al. ...................... 23/202 V |
| 2,957,753 | 10/1960 | Nelson et al. ...................... 23/202 V |
| 2,311,452 | 3/1967 | Goodgame et al. ................. 23/202 V |
| 3,214,282 | 10/1965 | Wilson ................................ 106/300 |
| 2,779,662 | 1/1957 | Frey .................................... 23/202 |
| 3,068,113 | 12/1962 | Strain .................................. 23/202 X |

Primary Examiner—Edward Stern
Attorney—Chisholm & Spencer

[57] ABSTRACT

The preparation of pigmentary metal oxide, e.g., titanium dioxide, by vapor phase oxidation of metal halide, e.g., titanium tetrahalide, is described. The difficulties associated with providing a high temperature reaction zone and/or preheating reactants are discussed and a method is proposed for providing heat to the reaction zone to maintain said reaction.

12 Claims, 7 Drawing Figures

Patented March 21, 1972

INVENTOR.
EDWARD M. ALLEN
BY Chisholm and Spencer
ATTORNEYS

Patented March 21, 1972

INVENTOR.
EDWARD M. ALLEN
BY Chisholm and Spencer
ATTORNEYS

PROCESS FOR PREPARING PIGMENTARY METAL OXIDE

CROSS-REFERENCE TO RELATED APPLICATIONS

This application is a continuation of U.S. application Ser. No. 361,008, filed Apr. 20, 1964, now abandoned, and a continuation-in-part of U. S. application Ser. Number 234,062, filed Nov. 2, 1962, now abandoned, which was a continuation-in-part of U. S. application Ser. No. 13,860, filed Mar. 9, 1960, now U.S. Pat. No. 3,069,282.

This invention relates to the production of metal oxide, notably titanium dioxide, pigment by vapor phase oxidation of metal halide, primarily titanium tetrahalides such as titanium tetrachloride, titanium tetrabromide and titanium tetraiodide.

Until recent years, substantially all pigmentary titanium dioxide has been produced by the well-known sulfate process. Considerable interest in recent years has been shown in another method for producing pigmentary titanium oxide. This process involves oxidizing a titanium tetrahalide vapor, particularly titanium tetrachloride vapor. This is typically accomplished by reacting titanium tetrachloride vapor and oxygen under controlled conditions at temperatures at which this reaction is relatively rapid.

Various techniques have been proposed for effectuating this process. Many of these proposals lay stress to the manner in which the reactants, for example, oxygen and titanium tetrachloride, are brought together. Significant as this aspect of the process is, a mandatory requirement for successful production of quality pigment is a high temperature reaction zone. Thus, it is most important that the reaction is achieved in a zone at a temperature above 800° C., preferably above 900° C. up to 1,600° C.

In addition to temperature requirements, it has been found important that the reactants, for example, oxygen and titanium tetrachloride, by highly mixed in a reaction zone at the optimum temperature therein. Because of the high temperature requirements of the reaction, effecting proper intermixture within the reaction zone represents a difficult problem.

Various proposals have been made for achieving intermixture of the reactants in a high temperature zone. These proposals require either high temperature preheat of each of the reactants, e.g., oxygen and titanium tetrachloride, or igniting a separate fuel stream in the reaction zone. The former technique suffers from cost of construction of preheat equipment and complications resulting from the reactive and corrosive effects of hot titanium tetrachloride on preheat and reactor apparatus. The letter technique suffers from the difficulty of controlling flow patterns of reactant and fuel streams in the reaction zone. Moreover, the presence of chlorine in the reaction zone tends to cause flame instability, thereby requiring excessive amounts of fuel to maintain the reaction temperature.

There is herein described a process for producing pigmentary titanium oxide which averts the aforementioned difficulties of other processes. The process of this invention allows for the production of quality pigmentary titanium oxide wherein the titanium tetrachloride may be preheated in contact with low cost and permanently fixed metal surfaces and fed to the reaction zone through metal surface inlets. In addition, the process of this invention provides that the high temperature of reaction is obtained with the minimum of fuel and exists wherever the reactants are properly intermixed. Thus, a great variation may be effected in the feed rates of the various materials, thereby changing the point of turbulence which is necessary for proper intermixture, yet at the same time providing at the changed point of turbulence a high temperature zone sufficient to maintain the reaction so that high quality pigmentary titanium dioxide is produced.

The process of this invention involves generating substantial heat for the vapor phase oxidation of a titanium tetrahalide or other metal halide in a confined reaction zone or chamber by establishing and maintaining a radiant heat source above 1,500° C., preferably 3,000° to 20,000° F., at a location spaced from the reaction zone but visually and radially in line with said zone such that heat may be radiated in a direct line into said zone.

By so establishing the reaction zone and heat source, e.g., in a direct line, it is also possible to heat one or more gaseous or vaporous streams, e.g., a reactant stream or an inert gas stream, by passing the gas stream through or near said heat source and then feeding the heated gas stream directly into the reaction zone without contact or deflection of the gas stream by a passageway wall.

By the practice of this invention, e.g., heating a reactant gas stream by passage near or through a radiant heat source, pigmentary metal oxide, particularly pigmentary $TiO_2$, is produced without breaking down or deteriorating the passage walls thermally or frictionally, and thus the introduction of undesirable wall particles into the reaction zone or chamber is prevented.

Likewise, in the practice of this invention, e.g., where a radiant heat source is directly in line with the reaction zone or chamber, heat is radiated directly into said zone or chamber without undue initial contact with the walls of the passage or conduit connecting or joining the radiant source and reaction zone or chamber.

The advantages indicated above, as well as others, are obtained from one preferred embodiment of this invention which involves feeding a stream containing carbon monoxide to a combustion zone radially in line with a vapor phase oxidation reaction zone where it effects contact with a separately fed stream containing oxygen. A mixture of the separate streams is ignited to cause combustion of the carbon monoxide and provide a hot combustion zone. The hot products of combustion formed in the combustion zone are removed and fed while at a temperature of at least 1,250° C. to a spaced reaction zone at 800° C. or above, which reaction zone is separate, distinct and in a radial line from the combustion zone. Concurrent therewith, a separate stream containing titanium tetrahalide, notably titanium tetrachloride, at below 700° C., preferably below 600° C., is fed to the reaction zone and is intermixed with the hot products of combustion within the reaction zone in the presence of an oxidizing agent for the titanium tetrahalide to produce pigmentary titanium oxide. The temperature within the reaction zone is essentially provided by the hot product stream, the stream containing titanium tetrahalide and heat generated from the exothermic reaction of titanium tetrahalide with the oxidizing agent.

In the operation of this embodiment, separate streams of carbon monoxide gas and oxygen are fed to the combustion zone. As a result, it is possible to attain extremely stable combustion of the CO gas, which is characterized by a stable radiant flame in the combustion zone. In addition, this technique provides for a maximum turndown-turnup limit of the radiant flame within the combustion zone, i.e., the flame can be enlarged or reduced in size dependent upon the amount of CO and oxygen separately fed to the combustion zone, and this can be accomplished within a wide ratio of reactant feed without extinguishing the flame. Furthermore, by feeding the gases in the aforementioned manner, combustion is easily initiated and may be effected so as to take place essentially in space by simple adjustment of the direction and velocity of at least one of the reactant streams. As a result, the wall temperature of the combustion zone may be significantly below the highest temperature within the zone.

A significant advantage resulting from separate feeding of carbon monoxide and oxygen streams to the combustion zone resides in the ability to control the temperature of the combustion product without extinguishing the combustion reaction. This may be accomplished by varying the amount of each gas fed to the zone. This feature is most helpful since it often is necessary to vary the temperature of at least one of the streams charged to the reaction zone, e.g., where the reactants are initially mixed and reacted, during the vapor phase oxidation reaction. The process of this invention provides ready control of the temperature of the vapor phase reaction without materially varying the flow rates and velocity of the streams fed to the reaction zone.

The combustion zone is a chamber which may have a cylindrical, cubical or other type of shape, and is distinctly separate from the reaction zone. It may be positioned above, below, or adjacent to the side of the reaction chamber or zone. The combustion zone or combustion chamber is openly connected to the reaction zone by at least one passageway, typically a throated passageway. The size of the combustion zone is preferably large in cross-sectional area relative to the cross-sectional area of the passageway openly connecting it with the reaction zone. In most cases, the combustion zone has a cross-sectional area of at least 0.10 greater than the cross-sectional area of the throated passageway, determined perpendicular to the flow of the streams passing through the combustion zone and passageway. Preferably, the cross-sectional area of the combustion zone is at least 0.5 greater than the cross-sectional area of the passageway, which cross-sectional area is defined above.

The length of the combustion zone or combustion chamber at the point or points of entry of carbon monoxide and/or oxygen gas to the point or points of exit of the gas therefrom into the passageway or passageways, may be from 0.01 of the length of passageway to 20 times or greater than the length of the passageway, which length is determined in the direction of flow of the gases through the chamber and passageway. Preferably the combustion zone radiant heat source i is at least 2 feet but less than 10 feet, rarely greater than 20 feet from the hottest portion or point in the reaction zone.

Carbon monoxide gas which may be fed to the combustion zone need not always be free of other components present in monor concentrations. The process herein contemplated may, for example, be performed most satisfactorily with carbon monoxide containing a water and water forming content (including hydrogen and hydrocarbons) less that 2.5 per cent by volume, preferably less than 0.6 percent by volume, of the carbon monoxide gas, determined at 20° C.

Greater quantities of water cause formation of hydrogen halide, e.g., hydrogen chloride, in the reaction zone in amounts typically deleterious to the reactor and other equipment which is contacted by the titanium dioxide suspension stream educted from the reaction zone. Moreover, HCl formation represents lost chlorine for the chlorination of TiO containing ore.

In addition, any hydrogen halide, e.g., hydrogen chloride, absorbed by the pigment in the reaction zone or at a later stage in the treatment of the pigment requires additional expense in removing it prior to usage of the pigment in, e.g., paints. Moreover, excessive amounts of moisture in the carbon monoxide tend to cause excessive encrustation of hard $TiO_2$ on the reactant inlet to the reaction zone, which typically requires significant shrouding the reactant inlets with gases inert to titanium tetrahalides to avoid serious encrustation. In any event, the presence of significant amounts of water in the carbon monoxide is not found to enhance the degree and rate of combustion in the aforementioned zone so as to provide a higher temperature combustion product stream.

On the other hand, amounts of water in the CO gas fed to the combustion zone may be greater than the 2.5 per cent by volume, if the economics of removing the water from the gas precludes doing so. In this case, the operation of the process should be adjusted with respect to the equipment selected to preclude the effects of acid corrosion. This can be accomplished by selecting acid resistant refractory equipment in the cooling and separation steps for recovering the pigment from the product gases, notable of which is halogen, e.g., chlorine.

The separate carbon monoxide stream may be fed to the combustion zone in amounts ranging from about 5 to 200 mole per cent of the oxygen fed to the zone, typically from 5 to 75 mole per cent. Preferably, carbon monoxide is fed in an amount of from about 20 to 60 per cent of the oxygen.

The amount of oxygen gas introduced to the combustion zone is at least stoichiometric (preferably in excess) to the amount of carbon monoxide in the combustion zone, according to the equation $2CO + O_2 = 2CO_2$. In most cases, the amount of oxygen in excess of this stoichiometric amount is at least 50 per cent, preferably at least 75 per cent, of the molar amount of titanium tetrahalide vapor, notably titanium tetrachloride, intermixed with the hot combustion product stream. In the typical operation of the process of this invention, the amount of oxygen fed to the combustion zone in excess of the mount sufficient to convert the carbon monoxide to carbon dioxide, is from 0.9 to 2 times the molar quantity of the titanium tetrahalide vapor fed to the reaction zone, preferably from 1.001 to 1.5 times the molar quantity of titanium tetrahalide.

Usually the carbon monoxide and/or the oxygen are fed in a plurality of streams to the combustion zone from a plurality of inlets which may take the form of a burner with a plurality of inlets or a plurality of burners each having a single inlet. For convenience of operation, only one of the reactants need be fed from a burner having a plurality of inlets or a plurality of burner inlets. The other reactant may be fed from a single inlet or a plurality of inlets whereby to form a large single stream of gas which flows past all of the burner inlet openings for the other gas reactant on entry to the combustion zone. In preferred operation, only the carbon monoxide gas is fed from a plurality of inlets to provide a plurality of gas streams, typically more than three, each of which has a velocity on ejection from the inlet greater than the velocity of the single oxygen stream.

The higher the velocity difference between each of the plurality of high velocity carbon monoxide streams and the single low velocity oxygen stream, the quicker the reactants will be mixed. It is desirable to select a velocity difference sufficiently great enough to provide a degree of intermixture resulting in a high degree of combustion, yet low enough to prevent combustion in the inlet openings which could cause softening of the burner inlet.

The combustion product stream discharged from the combustion zone is typically composed of carbon dioxide, oxygen, and small amounts of carbon monoxide and water. It is desirable to maintain a ratio of carbon dioxide to carbon monoxide in the stream of at least 3 to 1, preferably at least 4 to 1. This may be achieved by adjusting the rate of intermixture of the oxygen and carbon monoxide streams by controlling the velocity differences described above. Moreover, the ratio of $CO_2$ to CO in the stream may also be controlled by the selection of size of the combustion zone or combustion chamber. A large combustion chamber will typically provide for a smaller quantity of carbon monoxide in the combustion product gases removed therefrom, whereas the opposite may be expected in a smaller combustion zone or chamber. In addition, the amount of carbon monoxide in the combustion product stream can be reduced by elongating the passageway connecting the combustion zone and the reaction zone. It is desirable that the throated passageway connecting the combustion zone and the reaction zone have a length sufficient to allow for substantially complete combustion of carbon monoxide in the combustion product stream.

On issuance of the combustion product stream to the reaction zone from the throated passageway, the combustion product stream typically contains less than 20 per cent by volume of CO, preferably less than 5 per cent by volume of CO. It is contemplated that by the time the combustion product stream enters the zone of reaction, the carbon monoxide concentration is substantially exhausted. This is evidenced by the termination of the radiant flame formed in the combustion zone at about the zone of mixing and reaction at a location 2 feet from the hottest area of the zone and the fact that the gas removed from the reaction chamber typically contains little or no carbon monoxide.

The hot combustion product stream is fed from the connecting passageway into contact with the separately fed stream containing titanium tetrachloride. The stream containing titanium tetrachloride may be fed in the same direction as the combustion product stream from an inlet opening near the opening of the throated passageway to the reaction zone. In this embodiment, the stream containing titanium tetrachloride vapor is fed from the inlet as a parallel stream to the combustion product stream. Alternatively, the stream containing titanium tetrachloride vapor may be angularly fed into merging contact with the combustion product stream from an inlet opening facing into the combustion product stream as it emerges from the throated passageway.

The titanium tetrahalide containing stream, notably titanium tetrachloride, may be free of other materials or may contain materials which react in the reaction zone to contribute to the character of the titanium dioxide pigment produced. Thus, metal halides, metalloid halides, aromatic organic compounds, metal oxides, halogen gas and other additives may be fed to the reaction zone in association with the vaporous titanium tetrahalide reactant. In such cases, sufficient oxygen or other oxidizing agent should be present in the reaction zone to convert the material to the desired chemical state. In addition, it is possible to premix some oxygen containing gas or other oxidizing agent which releases oxygen on decomposition (notably, $NO_2$, $NO$ and $H_2O_2$) with the titanium tetrahalide vapor prior to introduction to the reaction zone. In this case, it is advisable to maintain the mixture at a temperature below 500° C., preferably below 400° C., to preclude premature reaction and possible encrustation of the inlet opening for the vapor mixture to the reaction zone. The oxidizing agent may be present in the stream in amounts up to about 25 mole per cent, basis moles of $O_2$ to moles of titanium tetrahalide. If the oxidizing agent is not oxygen and generates oxygen on heating of the stream, then the amount employed is based on the moles of 20 generated on heating of the stream.

In the preferred operation of this process, the titanium tetrahalide vapor containing stream is free of oxidizing agent prior to introduction to the reaction zone and all of the oxygen requirements are supplied with the combustion product stream.

In operation of the process of this invention, it is desirable to feed from an inlet adjacent to the path of the combustion product stream a separate stream containing a gas inert to the titanium tetrahalide so as to intervene with the product stream and the titanium tetrahalide containing stream prior to intermixture thereof. Preferably, the inert gas stream is fed from an inlet or inlets so as to surround and shroud the combustion product stream as it is emitted from its passageway. Both the combustion product stream and the titanium tetrachloride containing stream may be shrouded by the inert gas stream on passage to the reaction zone.

If the combustion product stream is introduced through a plurality of inlets, and the titanium tetrachloride containing stream is likewise fed to the reaction zone through a plurality of inlets, then each of these streams may be surrounded by an inert gas stream, or if these inlets are bundled together, the bundle may be surrounded by a single or plurality of inert gas streams.

The inert gas stream, particularly chlorine gas, has a surprising effect in producing desirable titanium dioxide pigment. It is found that when chlorine is employed during the oxidation of titanium tetrahalide, particularly titanium tetrachloride, the average particle size of the pigment so produced in accordance with the process above described is considerably smaller than when the inert gas is not employed. When the amount of inert gas employed during the operation is increased, the average particle size of the pigment is progressively reduced. In addition, the inert gas improves the particle size distribution of the pigment produced by the aforementioned process. Moreover, the inert gas, when introduced as described above, prevents encrustation of titanium dioxide on the reactant inlets.

In regard to this last feature, the inert gas shields the combustion product stream containing unreacted oxygen from the separate titanium tetrachloride containing stream so that the two streams do not significantly mix at a point close to their respective inlet opening. As a result, premature reaction close to the surface of the inlets is prevented, thereby materially minimizing, typically eliminating, hard encrustation of undesirable titanium oxide product at the inlet.

Encrustation as described above is exceedingly undesirable since an excessive amount thereof plugs the flow of the reactants to the reaction zone or tends to shift the flow pattern of the reactants to the reaction zone during an extended run. Such a shift reduces effective contact between the reactants, thereby preventing proper mixing necessary for producing high quality pigmentary product.

The preferred inert gas, as mentioned above, is chlorine, but other gases may also be employed, though these usually do not assert the same effect on the pigment particle size as does chlorine. Other inert gases include nitrogen, carbon dioxide, recycled tail gases from the aforementioned vapor phase oxidation reaction, and argon. Typically, the amount of inert gas fed to the reactor interior is on the order of from about 0.01 to 200 mole per cent, preferably 5 to 100 mole per cent, of the titanium tetrahalide introduced to the reaction zone.

In addition, it has been found that certain additives to the reactants, as hereinabove, described, give significant and beneficial results as characterized by the properties of the pigmentary titanium dioxide produced. For example, if an aluminum compound, notably an aluminum slat, e.g., an aluminum halide as $AlCl$, $AlB_3$, or $AlI_3$, is added to the titanium tetrahalide stream or to the intervening inert gas stream, the titanium dioxide product so produced is found to have an increased rutile content, typically in excess of 98 per cent, in most cases above 99 per cent, and an enhanced particle size distribution.

The addition of these aluminum compounds to the reaction typically causes no loss in the pigment's beneficial property. The same result occurs when zirconium salt, such as zirconium halides, particularly zirconium tetrachloride, is similarly added to the reaction.

The amount of aluminum and zirconium compound added to the reaction may vary within a great range, though it is advisable to employ from about 0.5 to about 10 mole per cent of the titanium tetrahalide reacted. This should give a corresponding molar concentration of aluminum and/or zirconium ions in the pigment.

A silicon salt, notably silicon halides, such as silicon tetrachloride, silicon tetrabromide or silicon tetraiodide, may also be incorporated in the reaction by addition to the titanium tetrahalide stream or the aforementioned inert gas stream. Silicon halides are found to repress the particle size growth of the pigment produced in the oxidation reaction. Additionally, this additive is found to favor the production of an anatase pigment. When the silicon halide additive is conjointly added with the aforementioned aluminum or zirconium additives, the anatase forming character of the silicon additive is significantly repressed, particularly when the silicon additive is employed in amounts of from 0.001 to 2.7 mole per cent, preferably from 0.01 to 2 mole per cent, of the titanium tetrahalide introduced to the reaction. Most favorable results are obtained when the amount of silicon is in the range of from about 0.05 to 1.2 mole per cent. The resulting pigmentary product will contain a silicon content similar to the molar concentration of the silicon halide fed to the reaction. Simultaneous with the addition of the silicon additives, there may also be added the aluminum or zirconium compounds in the amounts indicated above for each of these additives.

There may also be introduced to the reaction, alkali metal and/or alkaline earth metal compounds. Potassium compounds are found to give particularly beneficial results with regard to the type of pigment produced. The potassium compound may be in salt or other form. Typical usable salts include potassium chloride, potassium sulphate, potassium nitrate or potassium acetate, or a mixture of these. Other contemplated potassium compounds include organic potassium compounds where the potassium is directly bonded to a carbon atom of an organic radical. Examples of organic compounds are potassium alkyls, such as ethyl potassium and nonyl potassium; aromatic potassium compounds, such as potassium benzene (phenyl potassium), 1,4-di-potassium phenylene, and 1,7-di-potassium anthracene; aralkyl potassium compounds such as benzyl potassium; or alkaryl potassium compounds such a benzyl potassium; or alkaryl potassium compounds such as di-potassium durene (1,4-di-potassium-2,3,5,6-tetramethyl benzene) and xylyl potassium. The potassium salts may be added to the combustion product stream prior to its entry to the interior of the reaction zone, or may be separately fed to the reaction zone by introduction of another stream. Alternatively, the salts may be added to either the inert gas stream or the titanium tetrachloride stream, or both. The organic potassium compounds are most conveniently added to the titanium tetrachloride vapor stream when the stream has a temperature below 600° C., preferably below 500° C.

The potassium compounds may be added to the combustion product stream by first suspending the compound in an air stream or an oxygen stream or in a portion of the combustion product stream by atomizing the potassium compound therein. The potassium compound suspended in the stream will thereby be carried into the reaction zone by feeding the stream to the combustion zone and to the combustion product stream.

These potassium compounds are found to act similar to the silicon compounds in that they tend to repress the particle size of the pigmentary titanium dioxide produced during reaction. These compounds differ from the silicon compounds insofar as they appear not to favor the production of an anatase pigment. Thus, it may be employed alone or in conjunction with the aluminum compounds or may be employed in conjunction with the silicon compounds where the aluminum compound is also concurrently added.

Certain other metals or metal compounds may be beneficially employed in conjunction with the aforementioned potassium compounds or as a substitute for these potassium compounds to effect the same results. Contemplated metals are those listed in Groups IA and B (other than potassium) having an atomic weight below 133 and Groups IIA and B having an atomic weight below 138 of the Periodic Chart of the Elements found at Pages 58 and 59 of Lange's Handbook of Chemistry, 6th Edition (1946), published by Handbook Publishers, Inc., Sandusky, Ohio. Of these metals, magnesium, calcium, copper and zinc are preferred. These metals may be employed in the metallic vapor state or as salts, viz. magnesium chloride or phosphate, calcium chloride, or acetate, cupric chloride or sulphate, vaporous zinc or zinc oxalate; or they may be bonded directly to carbon of an organic compound as described for the aforementioned potassium compounds.

The above metals (including potassium) may be added to the vapor phase oxidation of titanium tetrachloride in amounts ranging from 0.01 to 10,000 parts by weight of metal ion per million parts by weight of titanium dioxide obtained from the oxidation reaction. Preferably, the amount of metal ion added is less than 1,000 parts by weight per million parts by weight of titanium dioxide. In view of the small amounts needed to benefit the pigment, the amount of metal or metal compound added is typically determined by the amount of metal found in the pigment so produced.

In U.S. Pat. No. 3,068,113, issued Dec. 11, 1962 to Franklin Strain et al., there is disclosed a method of producing titanium dioxide which involves the significant feature of introducing finely divided, white, non-discoloring metal oxide into the vapor phase oxidation reaction.

A method of introducing the finely divided, white metal oxide particles, as described in said copending application involves passing the hot combustion product stream containing unreacted oxygen into contact with a stream containing a mixture of chlorine and aluminum chloride, titanium tetrachloride or other metal halides. This results in effecting a reaction between the aluminum chloride or titanium tetrachloride and oxygen to produce small particle sized aluminum oxide or titanium dioxide which on being carried along with the combustion product stream contacts titanium tetrachloride vapor further along the path of the combustion product stream in the reaction zone to produce pigmentary titanium dioxide of larger particle size.

Preferably, the greatest proportion of the finely divided metal oxide particles, notably aluminum oxide or titanium oxide, is of an ultimate particle size below 0.15 microns, preferably below 0.10 microns. The particle size of the aluminum oxide formed by the reaction between, e.g., aluminum chloride in admixture with chlorine and the oxygen present in the combustion product stream is determinable by simply shutting off the introduction of titanium tetrachloride to the reaction. In this fashion, only oxygen in the combustion product stream is reacted with the aluminum chloride, and the resulting aluminum oxide particles may be recovered from the reaction chamber. Collection of the aluminum oxide particles should be effected as high up in the interior of the reaction chamber as possible, preferably within 4 feet from the bottom of the reactant burner. These metal oxides may be added in amounts ranging from 0.1 to 20 mole per cent metal oxide, preferably from 0.1 to 10 mole per cent metal oxide, basis moles of titanium tetrachloride, notably $TiCl_4$, fed to the oxidation reaction.

To obtain maximum performance from the vapor phase oxidation reaction as described above, it is desirable to adjust the temperature within the reaction chamber so that there is a diminishing temperature gradient in the direction of the flow of the various gases through the reaction chamber. Thus, the highest temperature within the reaction chamber should be at about the point of complete intermixture of the reactants in the reaction chamber. The temperature within the reaction chamber should gradually decrease from this point to a temperature on emission from the reaction chamber well above reaction temperature, viz., above 750° C., typically above 800° C., preferably above 900° C. up to 1,300° C. Thus, the temperature within the reaction chamber from the point of maximum reaction, which is determinable as the highest temperature zone within the reaction chamber where intermixture of the reactants is effected, should decrease from a high temperature in excess of 800° C., to a lower temperature in excess of 750° C. Typically the temperature of the reaction zone will exceed 900° C. to 1,100° C. and the temperature of the products on removal from the reaction chamber will be at a temperature in excess of 750° C., desirably in excess of 800° C.

The reaction chamber should be large enough so that the overall flow of gas through the reaction chamber allows for an average temperature decrease of about 25° C. or more per second of residence time, which is determined as the time for gas flow from point of entry of the reactants to the interior of the reaction chamber to point of exit therefrom for removal of titanium dioxide suspended in product gases. Preferably the average temperature decrease does not exceed 200° C. per second of residence time.

The utilization of the diminishing temperature gradient within the reaction chamber is found to reduce the particle size of the pigment which enhances the pigment's overall performance in paints.

A diminishing temperature gradient within the reaction chamber may be achieved in several ways. For example, a gas inert to the titanium tetrahalide may be introduced to the interior of the reaction chamber adjacent and downstream from the point of maximum reaction so as to effect contact cooling of the titanium dioxide suspension. The gas may be fed through a vertical pipe or pipes internal of the reaction chamber and centrally disposed therein, or may be fed, preferably, from a plurality of pipe inlets along the interior wall of the reaction chamber so as to form a spiraling stream of inert gas thereabout. Spiraling of the gas into the interior of the chamber is not a mandatory requirement, but is appears from practice to operate most efficiently in effecting reduction of the temperature within the reaction chamber as well as protect the interior walls of the reaction chamber. On the other hand, the inert gas may be fed directly at the central interior of the reaction chamber from a plurality of points concentrically arranged thereabout.

Another method for reducing the temperature within the reaction chamber involves reducing the depth of the refractory insulating lining on the interior of the reaction chamber at points below the zone of highest temperature. This causes cooling by conduction, particularly at the lower portion of the reaction chamber close to the product exit. The same result can be effected by indirect cooling through the walls of the reaction chamber. In this embodiment, the walls are desirably made of metal typically aluminum, nickel, stainless steel or stainless steel-nickel alloys, and cooling is effected by passing a fluid coolant over the exterior surface of the chamber. As a result, heat is conducted through the walls to the coolant, which is periodically removed from contact with the walls. Air, water, perchloroethylene, or other fluids are desirable coolants for this purpose. A metal reaction chamber is most desirable due to its low cost of construction and easy maintenance. The metal lining will not be hindered by chlorine or titanium tetrachloride present in the reaction chamber when the interior surface thereof is kept below 700° C., typically below 600° C., at which temperature the metal is fairly resistant to corrosion.

To more specifically describe the process of this invention, reference is made to FIGS. 1 to 6, inclusive, which depict apparatus in which the aforementioned process may be effected.

Figure 1:
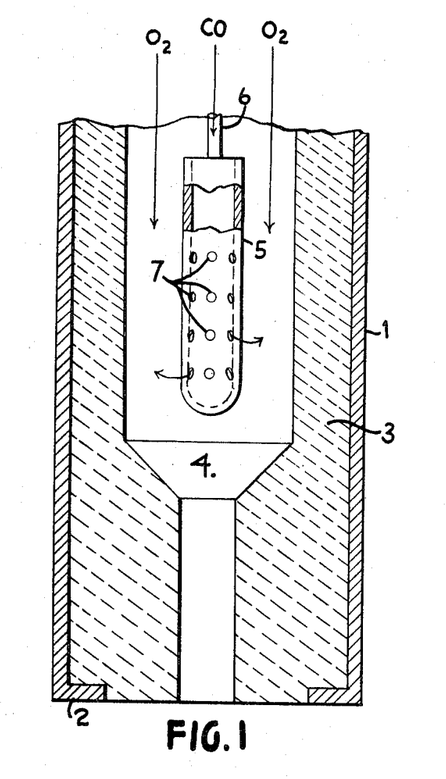
FIG. 1 describes a diagrammatic cross section view of a combustion chamber and throated passageway utilizable in the invention hereinabove described.

Referring to FIG. 1, can 1 which preferably is a cylindrical nickel container with a bottom lip 2 has suspended thereon refractory material 3. Refractory material 3 is any heat insulating ceramic refractory that can withstand a 1,250° C. temperature for at least one day without cracking, melting or physically deteriorating in any significant way. Usable refractory materials include high alumina containing firebrick, to wit, firebrick containing from about 40 to 100 per cent alumina by weight thereof, preferably from about 60 to 90 per cent by weight of alumina. This type of firebrick is predominantly alumina silicate and the alumina content thereof is in association with the silica content. Other usable firebrick material include high temperature resistant zirconia and silicon carbide.

Refractory 3 may be a machined unitary piece of refractory which is inserted in container 1 resting on lip 2 thereof. Preferably, refractory 3 is a series of donut shape firebrick blocks which are laid one upon the other to establish combustion zone 4 therein. Typically these blocks are cemented together and to container 1.

Combustion zone 4 surrounded by firebrick 3 is a chamber having a relatively large horizontal diameter compared to the diameter of passageway 8 through which combustion product gas is emitted. Fitted within chamber 4 is refractory combustion burner 5 having therein a plurality of holes 7. Burner 5 has a hollow interior which opens into pipe 6, typically connected to a carbon monoxide gas source. Oxygen is fed from exterior of burner 5 to combustion zone 4. Alternatively, combustion burner 5 may be employed for the introduction of oxygen gas and in this case CO gas is fed to zone 4 exterior of burner 5.

Combustion zone 4 gradually terminates on contracting incline plane at throat 8 which is typically a cylindrical hole extending through refractory 3 and opening into the interior of the reaction chamber.

Carbon monoxide gas fed from pipe 6 to the interior of nozzle 5 issues as a plurality of streams from holes 7 to contact oxygen gas passing over the exterior surface of burner 5. A pilot light is inserted into combustion chamber 4 to cause ignition of the carbon monoxide-oxygen reaction, thereby effecting combustion of the carbon monoxide. Combustion product gas containing unreacted oxygen because the excess quantity of oxygen provided in combustion zone 4 is fed as a stream through throated passageway 8 into the interior of the reaction chamber, not shown in FIG. 1.

Burner 5 is typically made of heat resistant refractory materials such as prefired lava, an aluminum silicate refractory material.

Figure 2:
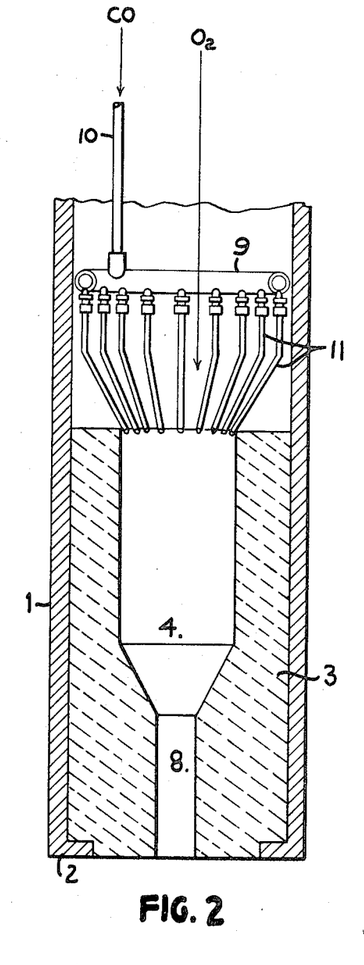
FIG. 2 illustrates a diagrammatic cross section view of a different combustion chamber and throated passageway utilizable in the invention hereinabove described.

Referring to FIG. 2, there is shown the same combustion zone and chamber arrangement disclosed in FIG. 1 except that instead of employing refractory burner 5 for injecting carbon monoxide into the combustion chamber (zone 4) there is employed a plurality of metal jet burners 11. Thus, carbon monoxide gas is fed to tube 10 into metal manifold 9, typically made of stainless steel, nickel, or alloys thereof, and thence into the burners 11, which are tubes constructed of stainless steel, nickel, or alloys thereof. From above manifold 9, cool oxygen (at e.g., 20° C. to 200° C.) is fed from an inlet (not shown) over jet burners 11, thus keeping the temperature of the metal surfaces below the softening points thereof, and thence into admixture with the carbon monoxide issuing from the jets. A gas lance is inserted into the combustion zone and the mixture is ignited to effect combustion of the carbon monoxide.

The combustion products gas formed in a combustion zone 4 is discharged through throated passageway 8 into the reaction chamber (not shown).

In the case of both FIGS. 1 and 2, the combustion zone and can 1 are depicted as a cylindrical chamber and cylindrical container, respectively. Such configuration is not critical and combustion chamber 4 and container 1 can have any shape desired and found convenient for the operation of the above-described process. Thus, the interior of the chamber can be cubical, parallelepiped, pyramidal (including conical) or any other shape which is convenient in the operation.

Figure 3:
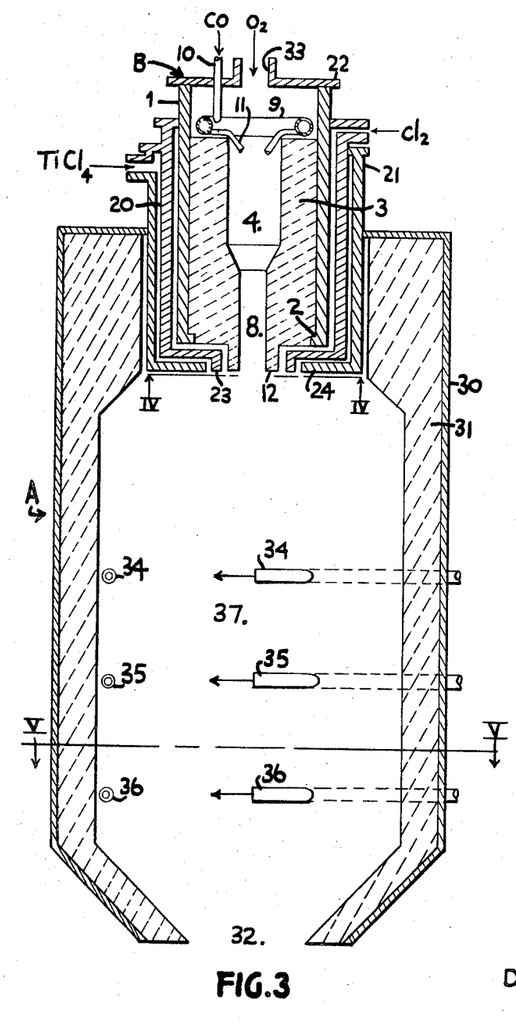
FIG. 3 is a diagrammatic cross section view of a reaction chamber containing a reactant burner having therein a combustion chamber similar to that illustrated in FIG. 2.

In FIG. 3, there is employed reactor A which has a steel shell 30 lined with heat resistant firebrick 31 circumscribing chamber 37. Firebrick 31 may be a high alumina content firebrick, as described above, particularly aluminum silicate firebrick which is resistant to the effects of chlorine at high temperatures. Fitted into an opening in the upper section of reactor A is reactant burner B. Burner B has a combustion chamber 4 as depicted for FIG. 2 with a throated passageway 8 radially connecting and opening into interior chamber 37. At the bottom of passageway 8 is concentric refractory lip 12 formed by machining refractory 3. At the upper portion of combustion chamber 4 is manifold 9 with burner jets 11. Carbon dioxide is introduced into mainfold 9 through tube 10 and emitted through jets 11 into zone 4, as described above. Oxygen is introduced to zone 4 through opening 33 located above combustion chamber 4.

Surrounding can 1 is a similar concentric metal can 20, typically nickel, with lip 23 at its lower portion. Cans 1 and/or 20 may be of solid metal construction or may have a hollow internal cooling. Can 20 with lip 23 is concentrically spaced from the outer wall of can 1. Thus, lip 23 arranged parallel to lip 2 of can 1 and concentrically spaced therefrom is extended to a point concentrically spaced from refractory lip 12 of refractory 3 and forms a downward leg to provide an annular space concentrically arranged with respect to cylindrical passageway 8.

Figure 4:
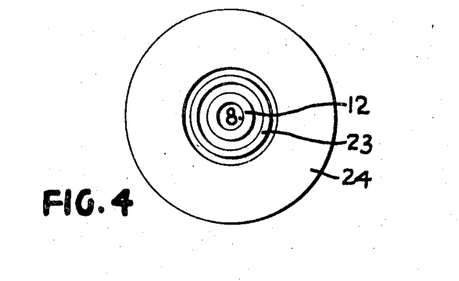
FIG. 4 further illustrates the construction of the reactant burner of FIG. 3 along lines IV—IV.

Surrounding can 20, and concentrically arranged thereto, is can 21. Can 21, similar in construction to can 20, has lip 24 at its lowest portion positioned parallel to the horizontal portion of lip 23 and concentrically spaced from the downward leg of lip 23. The spaced arrangement is further illustrated in FIG. 4.

The outer surfaces of the cans should be at a temperature not in excess of 700° C., preferably a temperature below 600° C. In typical operation the exterior surfaces of these cans are held at a temperature between 250° C. to 500° C., and this may be achieved by adjusting the rate of the gases fed to the reactor. Positioned on top of can 1 is steel top 22 having opening 33.

In the interior of reactor A are positioned pipes 34, 35 and 36 at separate horizontal levels within the interior of reactor A as shown in FIG. 3. The pipes are employed for the purpose of introducing to the chamber 37 inert gas such as chlorine, carbon dioxide, and recycled gases from the reaction, notable of which is halogen decomposition product of the titanium tetrahalide employed. In the preferred operation, recycled gases are employed.

These recycled gases are produced by virtue of the vapor phase oxidation of e.g., titanium tetrachloride. In this case they are produced in the reaction zone and are isolated from the pigmentary titanium dioxide when the titanium dioxide is separated from the gases by typical procedures as filtering in a dust collector or by electrostatic precipitation means. The gases generally obtained from the process of this invention notably contain carbon dioxide, chlorine if titanium tetrachloride is employed, and small quantities, typically trace amounts, of oxygen. When the process is operating with optimum efficiency no oxygen should be present in the recycled gas.

Figure 5:
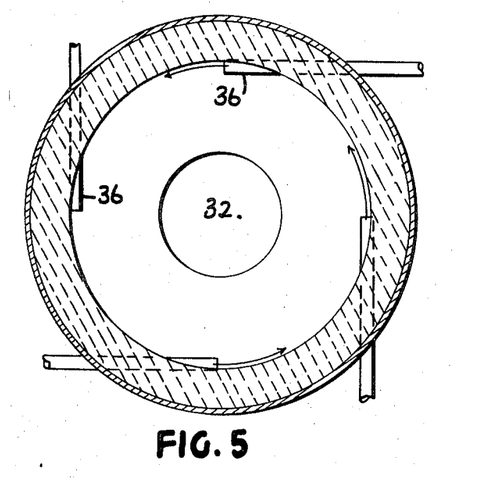
FIG. 5 further illustrates the construction of the reaction chamber of FIG. 3 along the lines V—V.

The gas is fed to interior chamber 37 from pipes 34, 35, and 36 to control the temperature within the chamber 37 so that the temperature of the products produced in the reaction zone, typically above pipe 34, are gradually cooled to a lower temperature still above 750° C. on removal through outlet 32. As shown in FIG. 5 the gas is introduced so as to spiral around the walls of the chamber A. Alternatively, the pipes may be arranged so as to pass the inert gas directly into the center of interior chamber 37.

The amount of gas fed through each one of the pipes to wit, 34, 35, and 36, may be adjusted so as to afford greater or lesser temperature differences within the chamber 37 at specific levels therein. For example, greater quantities of cool gas may be fed through pipe 34 and lesser quantities through pipes 35 and 36 or vice versa.

The inert gas, viz., recycle gas, fed to the interior chamber 37 typically has a temperature below 700° C., preferably below 500° C., and generally above 50° C. Typically, there is added 0.01 to 100 pounds of recycled gas for every pound of titanium dioxide produced within interior chamber 37.

In the operation of the apparatus as characterized in FIG. 3, oxygen gas is fed through opening 33 to chamber 4 and is mixed therewith with carbon monoxide gas fed into tube 10 to manifold 9 and thence through burner jet tubes 11 to the interior of combustion chamber 4. A gas lance which comprises a tube connected to a natural gas outlet and ignited at its tip to form a flame thereat is inserted through opening 33 to contact the intermixture of oxygen and carbon monoxide fed to the interior of chamber 4. Combustion is effected with continued introduction of carbon monoxide and oxygen gas and providing a flame which extends downwardly into the immediate upper portion of the reaction chamber at a location 2 feet from the hottest portion of the zone. The temperature within chamber 4 is increased to above 1250° C., typically above 1,500° C. The products of combustion are discharged from chamber 4 through throated passageway 8 directly into interior chamber 37 thereby heating chamber 37 above 800° C., preferably above 900° C. On reaching the desired temperature, titanium tetrachloride vapor above 140° C. up to 700° C., preferably between about 200° C. and 500° C., is fed to the TiCl$_4$ port in can 21 in an amount at least stoichiometric to the excess amount of oxygen present in the combustion product gas discharged through throated passageway 8. Simultaneous therewith chlorine gas is introduced to the Cl$_2$ port in can 20. The titanium tetrachloride vapor at 140' to 700° C., preferably between about 200° C. and 500° C., is educted from can 21 through the annular opening between lips 24 and 23 and the chlorine gas while at a temperature of from 50° to 600° c., typically below 500° C., is issued from the annular opening between lips 23 and 12.

Intermixture of the various gaseous streams is effected within interior 37 of reactor A whereby pigmentary titanium dioxide is produced. The reaction zone heated by the streams introduced thereto and the exothermic reaction $TiCl_4 + O_2 \rightarrow TiO_2 + 2Cl_2$ is at a temperature in excess of 800° C., preferably in excess of 900° C. The titanium dioxide particle suspension of pigmentary titanium dioxide particles, chlorine gas, carbon dioxide and a small amount of oxygen is removed from the reactor through outlet 32 after being cooled by tail gas fed through pipes 34, 35, and 36. The titanium dioxide is separated by filtration mans from the gases after being cooled to a temperature typically below 300° C.

Figure 6:
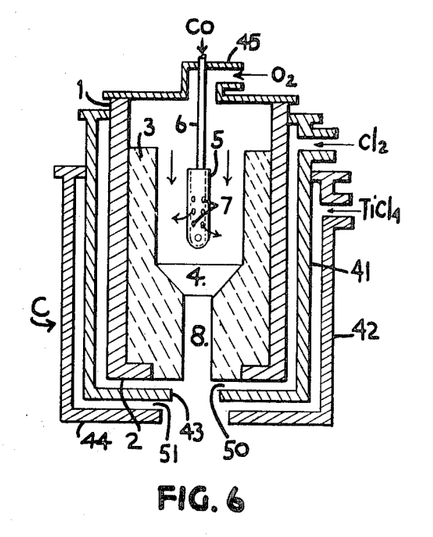
FIG. 6 depicts a diagrammatic cross section view of a different reactant burner from that disclosed in FIG. 3 having a combustion chamber similar to that described in FIG. 1.

FIG. 6 depicts burner C which may be employed in reactor A of FIG. 3. Burner C has a combustion chamber 4 with a carbon monoxide burner 5 made of prefired lava (aluminum silicate refractory). Carbon monoxide gas is introduced to the burner through tube 6 from a source exterior of the burner. Oxygen gas is introduced through port 45 to the interior of combustion chamber 4. Carbon monoxide gas fed to combustion chamber 4 through holes 7 is intermixed with oxygen and ignition is effected by gas lance introduction as described in the operation of the apparatus in FIG. 3. Can 1, can 41, and can 42 are maintained at a temperature below 600° C. by internal cooling or by feeding the cooler inert and reactant gases to the reactor at a sufficient rate to sweep heat from the metal surfaces so that the metal is at a temperature below which it rapidly decomposes.

Burner C is operated in the same fashion as burner B of FIG. 3, with the exception that the titanium tetrachloride reactant and the chlorine shroud for the hot product combustion stream discharged from throated passageway 8 are angularly projected from the slot openings 50 and 51, over lips 43 and 44, respectively.

In the operation of burner B of FIG. 3, the titanium tetrachloride vapor stream and the chlorine stream are fed from burner B in a parallel direction to the hot product combustion stream discharged from throated passageway 8. In the operation of burner C, the titanium tetrachloride vapor and the chlorine gas streams are angularly discharged from circular apertures 51 and 50, respectively, into merging contact with the combustion product stream discharged from throated passageway 8.

In the operation of burners B and C, the titanium tetrachloride vapor stream fed to the burners may contain a small amount of an aluminum compound and silicon compound as discussed above, for modification of the titanium dioxide product produced within furnace A.

Figure 7:
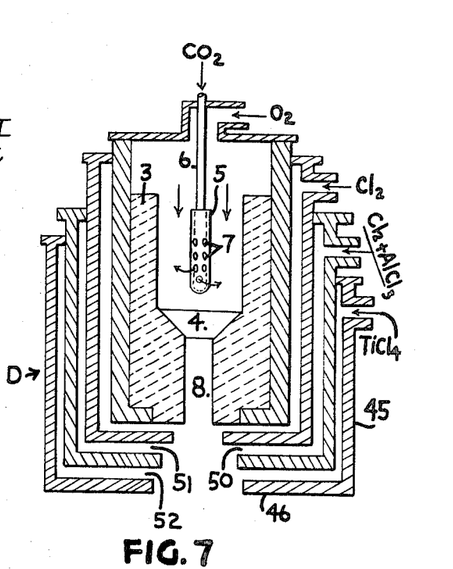
FIG. 7 illustrates a diagrammatic cross section view of a modified version of the reactant burner of FIG. 6 employable in the reaction chamber of FIG. 3.

With respect to FIG. 7, there is shown burner D which has essentially the same configuration as burner C, with one exception, and that is the employment of an additional metal can 45. In operation of burner D, the carbon monoxide and oxygen are fed to combustion chamber 4, as is the case with burner C, to produce hot product combustion stream containing oxygen. Chlorine is introduced into can 41 so as to be passed through slot 50. In the operation of burner C, titanium tetrachloride is fed into can 42. But in the operation of burner D, instead of feeding TiCl$_4$ to this can, there is fed a mixture of chlorine gas and a small amount of aluminum chloride or other metal chloride (e.g., zirconium tetrachloride or TiCl$_4$) capable of forming small nucleating particles according to the above discussion. This gaseous stream is emitted through slot 51 to contact the hot combustion product stream containing unreacted oxygen to cause reaction of the halide present in the stream to form the corresponding oxide. In operation of burner D, titanium tetrachloride vapor, which may also contain aluminum chloride or zirconium chloride and silicon tetrachloride, is fed to can 45. The titanium tetrachloride vapor is emitted from can 45 through slot 52 and thence into admixture with oxygen at a point removed from the burner and within the interior 37 of reactor A.

In the operations of burners B, C, and D, the hot combustion product stream containing unreacted oxygen having a temperature in excess of 1250° C. is first contacted with an inert gas stream fed from a slot provided thereabout. The inert gas stream, which is typically chlorine, prevents this stream from contacting the titanium tetrahalide vapor stream introduced from a slot adjacent or slightly removed therefrom, thereby to prevent oxidation of titanium tetrachloride at a point close to the metal surfaces of the burners. This prevents hard oxide growth, known as encrustation, on the burner surfaces.

In the operation of the process of this invention, it is contemplated that oxygen may also be fed with the titanium tetrachloride stream when its temperature is held below 500° C. In such a case, up to 25 mol per cent of the amount necessary to convert the titanium tetrachloride to titanium dioxide can be fed with the titanium tetrachloride stream into the interior of reaction chamber A. Preferably, all of the oxygen employed for producing titanium dioxide is present in the hot combustion product stream fed through throated passageway 8.

Though the drawings depict burner apparatus employing metal cans, the same type of apparatus may be employed substituting heat resistant ceramic refractory, e.g., lava (aluminum silicate) or zirconia machined to the configuration of the metal cans. Due to frequent breakage of the refractory from thermal shock, increased rates of encrustation on the refractory and difficulty in construction, they are not as desirable as the metal cans in the operation of the process of this invention.

Reference is made to the following examples which serve to specifically illustrate the inventions herein described, but which do not serve to limit the scope of the inventions.

EXAMPLE I

In the following operation, a reactor of the type described in FIG. 3 was employed. The reactor was a 9-foot high vertical steel shell with an alumina silicate firebrick lining forming a cylindrical open interior in concentric relationship with the shell. From the top of the open interior for 12 inches, the interior had an 18-inch diameter from which the interior expanded at a 30° angle to form a 27-inch diameter reaction chamber 87 inches in length, the last 4 inches of which contracted at a 90° angle to a circular opening 12 inches in diameter. To the circular opening was attached a pipe leading to cool pipes and then to filter bags where the pigment was separated from the gases in which it is suspended. Fitted in the steel shell of the reactor were 2-inch steel pipes spaced about the shell. Two pipes were equidistantly spaced 14 inches from the top of the reactor, two pipes were equidistantly spaced 36 inches from the top of the reactor, and two pipes were equidistantly spaced 70 inches from the top of the reactor. Each of these pipes was positioned in the shell and through the refractory lining therein, terminating flush with the interior surface of the lining. Each of the pipes passed through the shell and lining in a direction tangential with the interior wall of the lining, as illustrated in FIG. 5.

Tightly fitted in the top 12-inch 18-inch diameter section of the reactor was a reactant burner which fitted flush with the terminus of the section, as illustrated in FIG. 3. The reactant burner was of the design of reactant burner C of FIG. 6. The burner had three cylindrical nickel cans each having a lip such as 2, 43 and 44 of FIG. 6. The lips were each spaced three-eighths of an inch from the adjacent lip to form circular apertures 50 and 51, each three-eighths of an inch wide. The diameter of aperture 50 was 2 inches and the diameter of aperture 51 was 2¼ inches.

Interior of can 1 were stacked cylindrical alumina silicate (45 percent by weight alumina) firebrick pieces having a 1½ inch diameter cylindrical hole forming passageway 8 having a length of 7½ inches and a diameter of 1½ inches. Atop these pieces were stacked firebrick pieces of the same composition to form combustion chamber 4 which expanded from passageway 8 at a 45° angle to form a 4-inch diameter chamber 4 having a length of 12½ inches.

Vertically positioned in the central interior of the combustion chamber 4 circumscribed by the aforementioned firebrick pieces was a cylindrical lava carbon monoxide burner similar to burner 5 of FIG. 1. The burner had an inside diameter of three-quarter inch, an outside diameter of 1¼ inches, and a length of 6 inches. The burner from the diameter of 1¼ inches, and sealed bottom thereof was 26 inches from the steel cover over the first can. The burner had 3 equidistant 3/16-inch holes 7, 1 inch from the bottom, and a set of six equidistant 7/32-inch holes 7, 2, 3 and 4 inches from the bottom thereof. Opening into the top of the burner was a ⅝-inch inside diameter stainless steel tube which extended through the steel cover of the can to a carbon monoxide gas source.

Each of the cans had an oxygen, chlorine and TiCl₄ port, as described in FIG. 6.

The above reactor and burner assembly was operated in the following manner:

Carbon monoxide gas at ambient temperature, about 25° C., at a rate of 4.2 gram moles per minute was fed to the carbon monoxide burner and into the chamber 4. Simultaneous therewith, oxygen gas at ambient temperature, about 25° C., at a rate of 11.0 gram moles per minute was fed through the oxygen port in combustion chamber 4 and the mixture in the chamber was ignited by inserting a gas flame lance (burning natural gas at the tip of a tube) through a small hole in the steel cover of the first can. This produced a hot combustion product stream having a temperature slightly above 1,500° C. (as estimated from the temperature of the firebrick pieces by optical pyrometric examination). The theoretical flame temperature within the combustion chamber was 2,100° C. This hot stream passed through the 1½ inch diameter passageway 8 in the central interior of the reactor. After the reactor interior was heated to 500° C., 8.1 gram moles per minute of TiCl₄ vapor mixed with 0.05 gram moles per minute of SiCl₄ vapor and 0.2 gram moles per minute of AlCl₃ vapor, was fed to the TiCl₄ port in can 42. The TiCl₄ vapor mixture on introduction to the port had a temperature of 427° C.

Simultaneous with the introduction of the TiCl₄ mixture, chlorine gas at 150° C. was introduced at a rate of 3 gram moles per minute to the chlorine port of can 41. Both streams issued from circular apertures 50 and 51 into merging contact with the combustion product stream and reaction appeared complete 20 inches from the end of the reactant burner. The highest measured temperature within the interior of the reactor was 1,260° C. The titanium dioxide separated from suspension in product gases had an excellent tinting strength, a blue undertone when employed in white enamels, a high rutile content and an excellent particle size (weighted) and particle size distribution.

EXAMPLE II

The process of Example I was repeated except that titanium dioxide free recycle gas, i.e., the gas mixture in which the pigment is suspended on removal from the reaction chamber and which is cooled to 65° C., was fed at a rate of 30 cubic feet per minute to a header connected to the steel pipes fitted in the steel shell of the reactor. The temperature within the reactor at the central interior of the reactor opposite the pipe openings ranged from 1,100° to 950° C., while the highest temperature at the outlet of the reactor was 900° C. The titanium dioxide product recovered from the reactor had a bluer undertone in white enamels in that the titanium dioxide product recovered from the process described in Example I.

EXAMPLE III

The apparatus employed in Example I was used in this operation, except that instead of the lava carbon monoxide burner there was employed a metal jet burner substantially as illustrated in FIG. 2. Thus, annular stainless steel manifold 9 had an inside diameter of one-half inch with an annulus outside diameter of 7½ inches. Attached to annulus manifold 9 was steel tube 10 connected to a carbon monoxide source exterior of the burner. Attached to manifold 9 were 16 equidistant stainless steel jet burner tubes 11, each having an inside diameter of one-eighth of an inch. The jet burner tubes terminate at the periphery of the hole in the upper refractory piece surrounding combustion chamber 4 as depicted in FIG. 2. Carbon monoxide gas was fed to tube 10 at the same rate as described for employment of the lava burner of Example I above. The remainder of the burner and reactor was the same as employed in Example I. The titanium dioxide product produced was found to be of essentially the same quality as that produced in the operation of the reactor described in Example I.

After termination of this reaction, the jets were examined to determine if the high temperature of the combustion zone deleteriously affected the tubes. Examination showed that the metal jets were free of any deterioration. This examination was effected after 100 hours of operation of the process.

Though the above description of construction of the reactant burner is specific to the use of metal whenever possible, other materials of construction may be conveniently substituted. Thus, the cans surrounding the combustion chamber and forming the lips between which, e.g., the $TiCl_4$ and chlorine are passed may be made of hard machinable refractory, such as mullite ($3Al_2O_3 \cdot 2SiO_2$), aluminum silicate or a siliceous material, such as quartz.

In addition, metal oxides other than titanium oxide may be produced by the above process. Thus, metal halides such as aluminum halides ($AlCl_3$, $AlBr_3$, $AlI_3$), zinc halides ($ZnCl_2$, $ZnBr_2$, $ZnI_2$), zirconium halides ($ZrC)_4$, $ZrBr_4$, $ZrI_4$), silicon halides ($SiCl_4$, $SiBr_4$, $SiI_4$), iron halides ($FeCl_3$, $FeBr_3$, $FeI_3$), and chromium halides ($CrCl_3$, $CrBr_3$, $CrI_3$) may be substituted for the titanium halides employed above to produce the corresponding oxide in pigmentary form.

Although the process has been described with reference to the specific details of a CO combustion flame source as a radiant heat source, other radiant heat sources may be employed in lieu of or in combination therewith. Such heat sources include other combustion means, e.g., the combustion of sulphur or sulphur containing compounds such as disclosed in U.S. Pat. No. 3,224,836, as well as an electrical source, e.g., a plasma or plasma ion generator with or without electrodes, e.g., radio frequency type plasma.

Though the above description of this invention has related to various details thereof, such are not to be construed as limitations of the invention except insofar as they are contained in the claims.

I claim:

1. In a process for producing pigmentary metal oxide by vapor phase reaction of the reactants metal halide and oxygen, said metal halide being selected from the group consisting of metal chloride, metal bromide and metal iodide, wherein said reactants are introduced into a reaction zone in a reactor and metal oxide is produced thereby and removed from said reactor and wherein metal halide reactant is introduced into said reaction zone at below reaction temperature, the improvement which comprises supplying sufficient heat to said reaction zone to maintain said reaction at reaction temperatures by heating a gas selected from the group consisting of inert gas, oxygen-containing gas and mixtures thereof to above reaction temperature by passage through a zone having a radiant heat source maintained at at least 3,000° F. and openly connected with said reaction zone, said radiant heat source being spaced from the reaction zone and visually in line therewith, forwarding thus heated gas directly into said reaction zone along said visual line, and mixing said metal halide with said heated gas at reaction temperatures in said reaction zone.

2. A process according to claim 1 wherein said metal oxide is titanium dioxide and said metal halide is selected from the group consisting of titanium tetrachloride, titanium tetrabromide and titanium tetraiodide.

3. A process according to claim 1 wherein the radiant heat source is maintained at temperatures from 3,000° F. to 20,000° F.

4. A process according to claim 1 wherein metal halide and oxygen are introduced into said reaction zone at below reaction temperature.

5. A process according to claim 4 wherein metal halide and less than a stoichiometric amount of oxygen, based on metal halide, is introduced into said reaction zone below reaction temperature and wherein oxygen is heated by passage through said zone of radiant heat.

6. A process according to claim 1 wherein the gas which is heated by passage through said zone of radiant heat is oxygen, and said oxygen is heated by passage in direct heat exchange relationship with said radiant heat source and wherein vaporous metal halide is introduced into said heated oxygen after it has passed said zone of radiant heat.

7. A process according to claim 6 wherein said vaporous metal halide is fed into said heated oxygen from a stream disposed around said heated oxygen and enters the perimeter of the heated oxygen.

8. A process according to claim 6 wherein said vaporous metal halide is titanium tetrachloride and the temperature of said vaporous titanium tetrachloride is below 700° C.

9. A process according to claim 1 wherein said radiant heat source is a carbon monoxide flame.

10. In a process for producing pigmentary titanium dioxide by vapor phase reaction of the reactants oxygen and titanium tetrachloride wherein said reactants are mixed in a reaction zone in a reactor and titanium dioxide is produced thereby and removed from said reactor and wherein vaporous titanium tetrachloride is introduced into said reaction zone at below reaction temperature, the improvement which comprises promoting mixing of reactants oxygen and titanium tetrachloride in said reaction zone at reaction temperatures and supplying sufficient heat to said reaction zone to maintain said reaction by heating oxygen-containing gas to above reaction temperatures by passage through a zone having a radiant heat source maintained at at least 3,000° F. and openly connected with said reaction zone, said radiant heat source being spaced from said reaction zone and visually in line therewith, forwarding thus heated oxygen-containing gas directly into aid reaction zone along said visual line, and mixing said vaporous titanium tetrachloride with said heated oxygen-containing gas at reaction temperatures in said reaction zone.

11. The process according to claim 10 wherein said radiant heat source is maintained at temperatures of from 3,000° F. to 20,000° F.

12. In a process for producing pigmentary titanium dioxide by vapor phase reaction of reactants titanium tetrachloride and oxygen at temperatures above 800° C. wherein said reactants are mixed in a reaction zone in a reactor and titanium dioxide is produced thereby and removed from said reactor and wherein vaporous titanium tetrachloride is introduced into said reaction zone at temperatures below 700° C., the improvement which comprises promoting mixing of reactants titanium tetrachloride and oxygen in said reaction zone at reaction temperatures and supplying sufficient heat to said reaction zone to maintain said reaction by heating oxygen-containing gas to above reaction temperatures by passage through a zone having a radiant heat source maintained at temperatures of from 3,000° F. to 20,000° F. and openly connected with said reaction zone by a direct passageway, said radiant heat source being spaced from said reaction zone and visually in line therewith, forwarding thus heated oxygen-containing gas through said passageway to said reaction zone along said visual line, and mixing said vaporous titanium tetrachloride with said heated oxygen-containing gas at reaction temperatures in said reaction zone.

* * * * *

PO-1050
(5/69)

UNITED STATES PATENT OFFICE
CERTIFICATE OF CORRECTION

Patent No. 3,650,694              Dated March 21, 1972

Inventor(s) Edward M. Allen

It is certified that error appears in the above-identified patent and that said Letters Patent are hereby corrected as shown below:

On the covering sheet, line 4 top of page, the Assignee is listed as "P.P.G. Industries, Inc., Pittsburgh, Pa." should be --PPG Industries, Inc., Pittsburgh, Pa.--

Signed and sealed this 3rd day of October 1972.

(SEAL)
Attest:

EDWARD M. FLETCHER, JR.
Attesting Officer

ROBERT GOTTSCHALK
Commissioner of Patents